US012394097B2

(12) United States Patent
Jacobs et al.

(10) Patent No.: US 12,394,097 B2
(45) Date of Patent: Aug. 19, 2025

(54) MACHINE LEARNING MODEL-BASED DETECTION OF CONTENT TYPE

(71) Applicant: Disney Enterprises, Inc., Burbank, CA (US)

(72) Inventors: Mitchel Jacobs, Malibu, CA (US); Anil Chakrahari, Burbank, CA (US); Ellie Kuang, Los Angeles, CA (US); Michael Smith, Hermosa Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 479 days.

(21) Appl. No.: 18/098,935

(22) Filed: Jan. 19, 2023

(65) Prior Publication Data
US 2024/0249438 A1 Jul. 25, 2024

(51) Int. Cl.
*G06T 7/90* (2017.01)
(52) U.S. Cl.
CPC ...... *G06T 7/90* (2017.01); *G06T 2207/20081* (2013.01); *G06T 2207/20208* (2013.01)
(58) Field of Classification Search
CPC ............. G06T 7/90; G06T 2207/20081; G06T 2207/20208; G06N 5/01; H04N 21/23439; H04N 21/816
See application file for complete search history.

(56) References Cited

U.S. PATENT DOCUMENTS

2022/0058783 A1* 2/2022 Kadu ................... H04N 19/172

OTHER PUBLICATIONS

Ronan Boitard, Michael Smith, Michael Zink, Gerwin Damberg, and Anders Ballestad "Predicting HDR Cinema Requirements from HDR Home Master Statistics" SMPTE 2018 Annual Technical Conference & Exhibition Oct. 22-25, 2018 12 Pgs.
Michael D. Smith and Michael Zink "On the Calculation and Usage of HDR Static Content Metadata" SMPTE Motion Imaging Journal Aug. 10, 2021 11 Pgs.

* cited by examiner

*Primary Examiner* — Christopher Wait
(74) *Attorney, Agent, or Firm* — Farjami & Farjami LLP

(57) ABSTRACT

A system includes a hardware processor, and a memory storing a software code and at least one machine learning (ML) model trained to distinguish between a plurality of content types. The hardware processor executes the software code to receive a content file including data identifying a dataset contained by the content file as being a first content type of the plurality of content types; predict, using the at least one ML model and the dataset, based on at least one image parameter, a first probability that a content type of the dataset matches the first content type identified by the data; and determine, based on the first probability, that the content type of the dataset (i) is the first content type identified by the data, (ii) is not the first content type identified by the data, or (iii) is of an indeterminate content type.

20 Claims, 5 Drawing Sheets

MACHINE LEARNING MODEL-BASED DETECTION OF CONTENT TYPE

BACKGROUND

Motion picture and other video-based content production companies typically accept distribution video masters from multiple sources that may use different workflows and production processes, and may target different consumer distribution video formats. Moreover, the creative processes used by different content sources may differ, so that content received from different sources may each have a different appearance, which makes it challenging for a distribution, mastering or quality-control specialist not involved in the creation of the content to be certain that the content is free of flaws. As a result, mistakes that are made during preparation of the distribution master may go undetected, and may undesirably cause the content to appear defective to consumers, or may result in delays, additional costs, or both, related to correcting the flaw at a later stage closer to the release date of the content to consumers. Consequently, there is a need in the art for an automated image analysis solution capable of distinguishing between different content types in order to detect when a mismatch exists between an expected video format of content received from a source and the actual format of that content.

DETAILED DESCRIPTION

Figure 1:
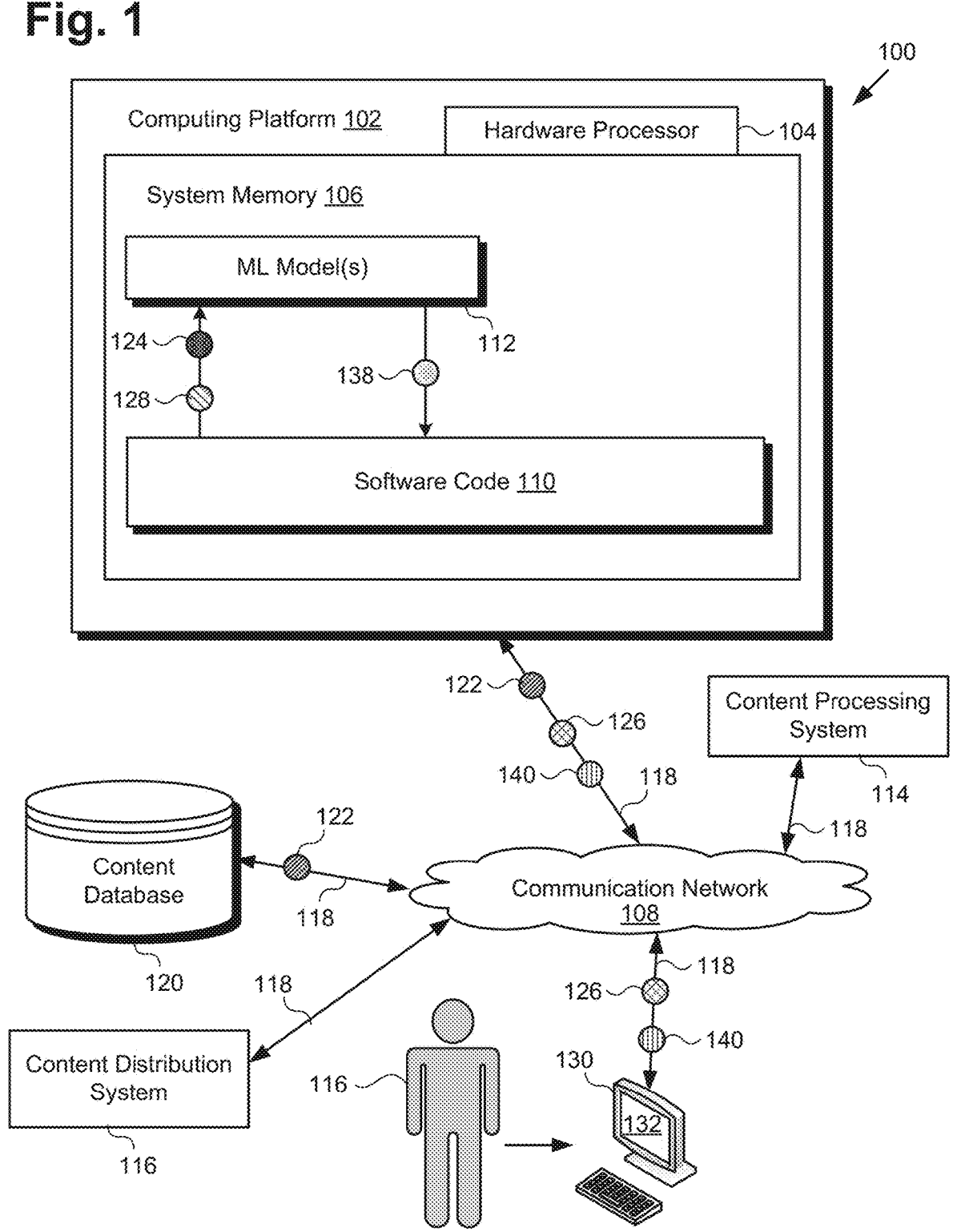
FIG. 1 shows an exemplary system for performing machine learning (ML) model-based detection of content type, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing machine learning (ML) model-based detection of content type. Video formats have different properties that are often standardized by standards organizations such as the Society of Motion Picture and Television Engineers (SMPTE) or the International Telecommunication Union (ITU). By way of example, such video format properties may include resolution, frame rate, chroma subsampling, electro-optical transfer function (EOTF), quantization range, color encoding primaries, and bitdepth. These video format properties will be described in further detail below. Thus, the expression "content type," as defined for the purposes of the present application, refers to content having a particular combination of video format properties, and content types can be different if one or more of those video format properties differ.

One specific example of different content types is standard dynamic range (SDR) content versus high dynamic range (HDR) content. Distinguishing between SDR and HDR content can be important when preparing content for distribution to consumers. For instance, processing SDR content using an HDR EOTF may result in images that appear overly saturated, while processing HDR content using an SDR EOTF may result in images that are low contrast, desaturated and muted. Processing either of SDR or DR content using a quantization range or color encoding primaries suitable for the other can also undesirably produce images that simply look wrong to consumers and thus may not appear as the content creators intended.

Despite their importance to the rendering of SDR and DR content, the EOTF, quantization range, and color encoding primaries of a video file are typically difficult to identify. Information about the EOTF, quantization range and color encoding primaries may also be carried in metadata fields that exist in a video or image file format, some file formats that can carry metadata values include TIFF, DPX, OpenEXR, MXF, MP4 and MOV. The metadata values carried in these file formats may be incorrect, or they may be not present or empty. The present automated solution for detecting content type employs one or more ML models specifically trained to recognize a content type based on a plurality of independent variables. The number of variables required to train an ML model to reliably predict content type for content files including tens of thousands or hundreds of thousands of video frames, for example, makes human performance of the present detection techniques impracticable or impossible, even with the assistance of the processing and memory resources of a general purpose computer. Thus, the novel and inventive systems and methods disclosed in the present application advantageously advance the state-of-the-art by introducing an automated ML model-based approach to detecting, for example, whether the video format of a content file matches its expected format. As a result, the solution disclosed in the present application advantageously reduces the likelihood that a consumer will be exposed to defective content, while also reducing the time and costs required to correct flaws in content by enabling their early detection.

It is noted that, as used in the present application, the terms "automation," "automated," and "automating" refer to systems and processes that do not require the participation of a human system operator. Although, in some implementations, a system operator or administrator may review or even adjust the performance of the automated systems and according to the automated methods described herein, that human involvement is optional. Thus, the methods described in the present application may be performed under the control of hardware processing components of the disclosed automated systems.

It is also noted that, as defined in the present application, the expression "machine learning model" may refer to a mathematical model for making future predictions based on patterns learned from samples of data or "training data." For example, machine learning models may be trained to perform image processing, natural language understanding (NLU), and other inferential data processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

FIG. 1 shows exemplary system 100 for performing ML model-based detection of content type, according to one implementation. As shown in FIG. 1, system 100 includes computing platform 102 having hardware processor 104 and system memory 106 implemented as a computer-readable non-transitory storage medium. According to the present exemplary implementation, system memory 106 stores software code 110 and one or more ML models 112 (hereinafter "ML model(s) 112") trained to distinguish between a plurality of content types.

As further shown in FIG. 1, system 100 is implemented within a use environment including communication network 108, content database 120, user system 130 including display 132, and user 116 of user system 130. In addition, FIG. 1 shows content processing system 114, content distribution system 116, image datasets 122, training data 124, content file 126 received from user system 130, dataset 128 included in content file 126, probability 138 predicted by ML model(s) 112 (hereinafter "first probability 138"), and alert 140 output by system 100. Also shown in FIG. 1 are network communication links 118 of communication network 108 interactively connecting system 100, content processing system 114, content distribution system 116, content database 120, and user system 130.

It is noted that although content database 120 is depicted as a database remote from system 100 and accessible via communication network 108 and network communication links 118 that representation is merely by way of example. In other implementations, content database 120 may be included as a feature of system 100 and may be stored in system memory 106.

Although the present application refers to software code 110 and ML model(s) 112 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts software code 110 and ML model(s) 112 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, one or more of software code 110 and ML model(s) 112 may be stored remotely from one another on the distributed memory resources of system 100. It is also noted that, in some implementations, ML model(s) 112 may take the form of one or more software modules included in software code 110.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 108 may be a high-speed network suitable for high performance computing (HPC), for example a 10 GigE network or an Infiniband network.

It is further noted that, although user system 130 is shown as a desktop computer in FIG. 1, that representation is provided merely by way of example. In other implementations, user system 130 may take the form of any suitable mobile or stationary computing device or system that implements data processing capabilities sufficient to provide a user interface, support connections to communication network 108, and implement the functionality ascribed to user system 130 herein. That is to say, in other implementations, user system 130 may take the form of a laptop computer, tablet computer, or smartphone, to name a few examples. Alternatively, in some implementations, user system 130 may be a "dumb terminal" peripheral device of system 100. In those implementations, display 132 may be controlled by hardware processor 104 of computing platform 102.

It is also noted that display 132 of user system 130 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 132 may be physically integrated with user system 130 or may be communicatively coupled to but physically separate from user system 130. For example, where user system 130 is implemented as a smartphone, laptop computer, or tablet computer, display 132 will typically be integrated with user system 130. By contrast, where user system 130 is implemented as a desktop computer, display 132 may take the form of a monitor separate from user system 130 in the form of a computer tower.

By way of overview, user 116, who may be a content production specialist such as a distribution, mastering or quality-control personnel for example, may utilize user system 130 to submit content file 126 identifying dataset 128 contained by content file 126 as being one of a plurality of content types to system 100. By way of example, content file 126 may be a media file including dataset 128 in the form of a video sequence payload, as well as metadata, video format parameters, or metadata and video format parameters describing the video sequence payload, i.e., dataset 128. Hardware processor 104 of computing platform 102 may execute software code 110 to receive content file 126, and predict, using ML model(s) 112 and dataset 128, based on at least one image parameter, such as one or more of EOTF, quantization range, or color encoding primaries for example, first probability 138 that the content type of dataset 128 matches the content type identified by the data included in content file 126. Hardware processor 104 may further execute software code 110 to determine, based on first probability 138, that the content type of dataset 128 (i) is the content type identified by the data included in content file 126, (ii) is not the content type identified by that data, or (iii) is of an indeterminate content type.

Figure 2:
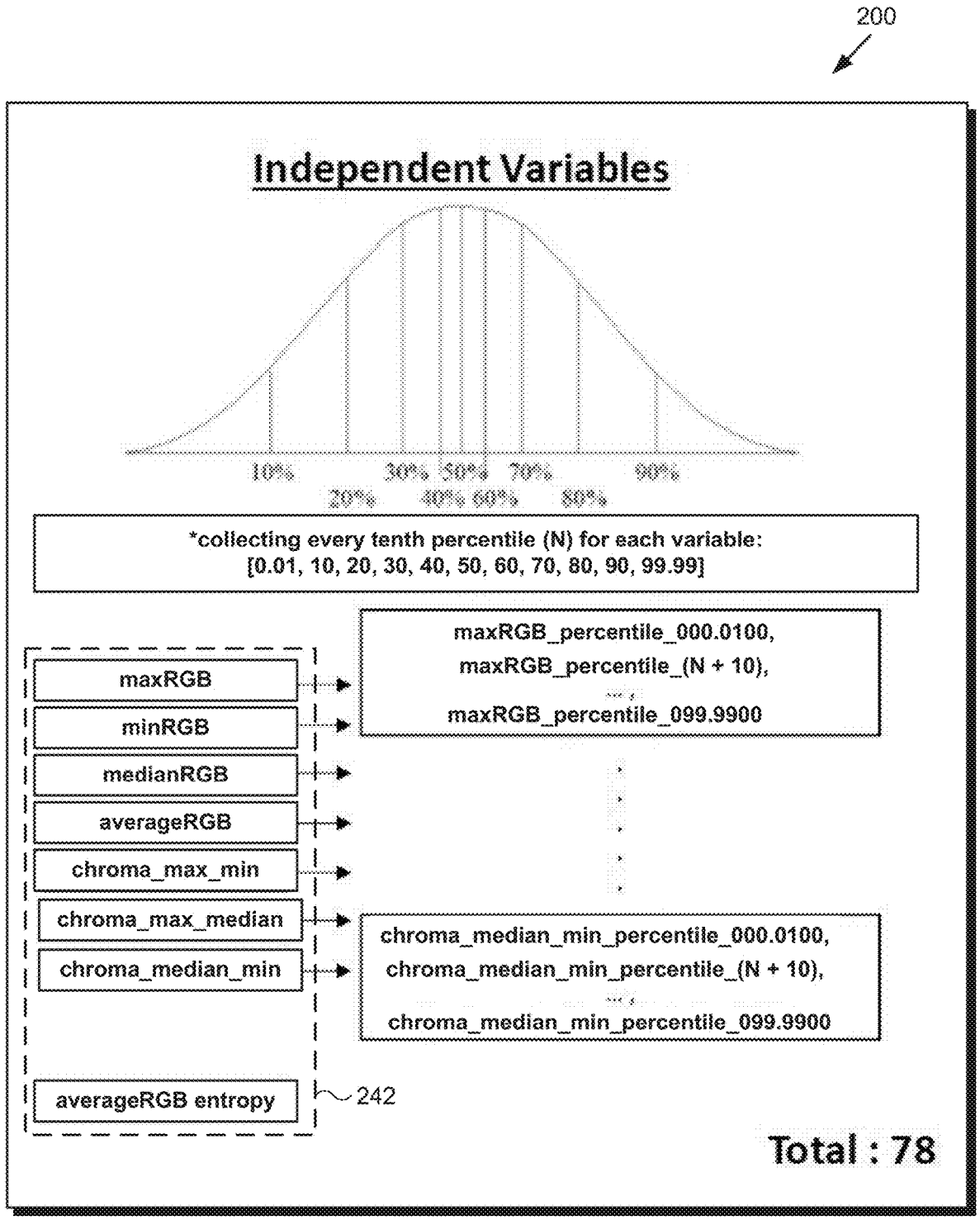
FIG. 2 shows exemplary independent variables for use in training an ML model to distinguish between a plurality of content types, according to one implementation.

FIG. 2 shows graphic 200 describing exemplary independent variables 242 for use in training an ML model to distinguish between a plurality of content types, according to one implementation. According to the exemplary implementation shown in FIG. 2, independent variables 242 are based on red, green, and blue (hereinafter "R," "G." and "B") color values, also referred to as codevalues. The independent variable maxRGB refers to the maximum (R,G,B) color value of a pixel in an image, minRGB refers the minimum (R,G,B) color value of a pixel in an image, and medianRGB refers to its median (R,G,B) color value of a pixel in an image. The independent variable averageRGB refers to the value (R+G+B)/3. The independent variable chroma_max_min refers to maxRGB−minRGB, chroma_max_median refers to maxRGB−medianRGB, and chromamnedian_min refers to medianRGB−minRGB. A histogram is calculated for each independent variable for each image and then percentiles are computed from the histogram information. Each of the aforementioned seven independent variables may be evaluated at each of 11 different percentiles of a statistical distribution for that variable (e.g., the $0.01^{th}$, $10^{th}$, $20^{th}$, $30^{th}$, $40^{th}$, $50^{th}$, $60^{th}$, $70^{th}$, $80^{th}$, $90^{th}$, and $99.99^{th}$ percentiles) to provide 77 variable values for each image in the movie, which may be joined by a single independent variable representing the averageRGB entropy for a total of 78 variables.

It is noted that the entropy of an independent variable considers all possible values of the variable and the probability of each of those values. When dealing with 10 bit integers, for example, the maximum entropy is 10 bits, but in most cases is less. RGB entropy is the color entropy for each of the red, green, and blue color channels, while averageRGB entropy is the average color entropy over those color channels.

According to the exemplary implementation shown in FIG. 2, a total of 78 independent variables is used to represent the video format of an image, where the video format, such as HDR or SDR for example, is a dependent variable. It is further noted that the use of 11 different statistical distribution percentiles is merely provided as an example. In other implementations, more, or less than, 11 different statistical distribution percentiles may be utilized. It is further noted that the choice of 78 variables is similarly merely exemplary, and in other use cases more, or less than, 78 variables may be used.

Figure 3:
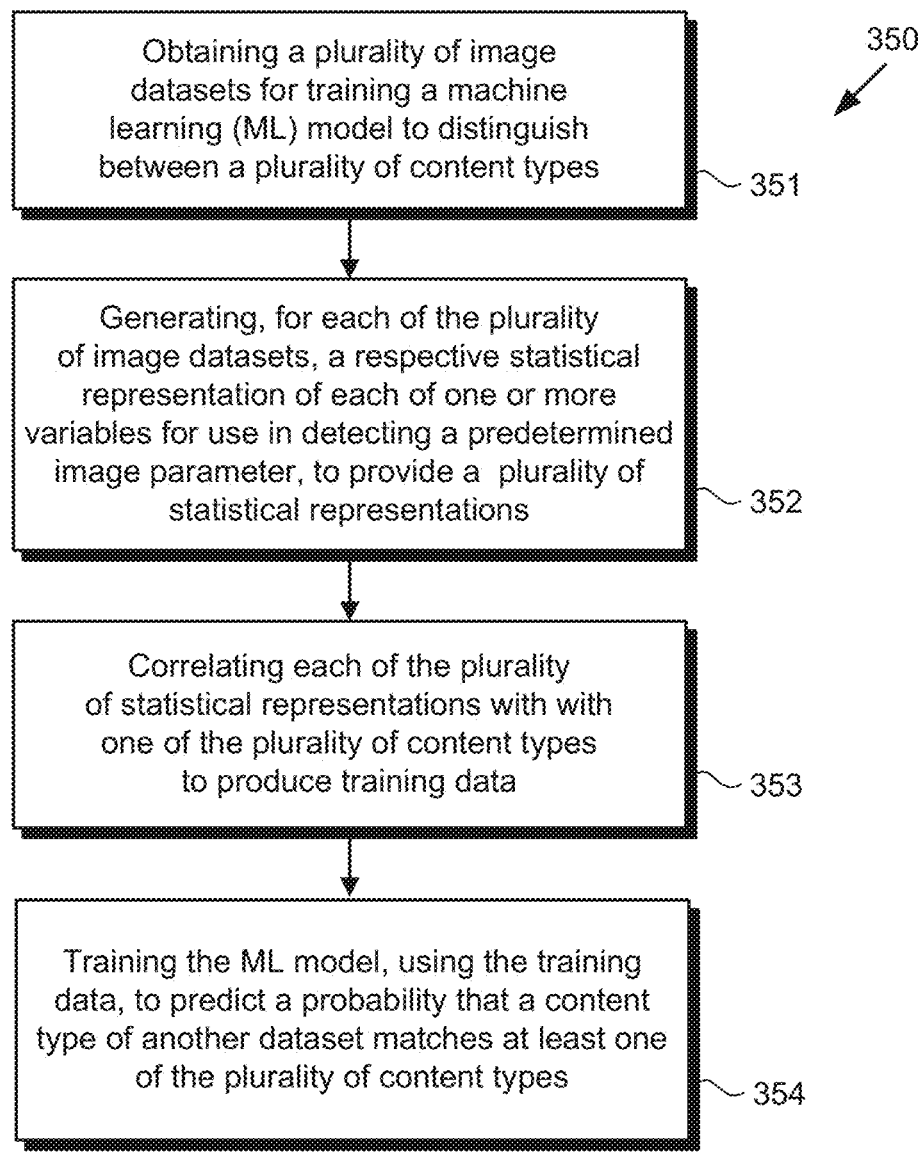
FIG. 3 shows a flowchart presenting an exemplary method for training an ML model to distinguish between a plurality of content types, according to one implementation.

FIG. 3 shows flowchart 350 presenting an exemplary method for training an ML model, such as ML model(s) 112 in FIG. 1, to distinguish between a plurality of content types, according to one implementation. With respect to the actions described in FIG. 3, it is noted that certain details and features have been left out of flowchart 350 in order not to obscure the discussion of the inventive features in the present application.

Referring to FIGS. 1 and 3 in combination, flowchart 350 includes obtaining a plurality of image datasets 122 for training ML model(s) 112 to distinguish between a plurality of content types (action 351). Each of image datasets 122 may include a plurality of images, such as tens, hundreds, or thousands of images in the form of digital video frames, for example. It is noted that the content represented in image datasets 122 may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the solution for detecting content type disclosed by the present application may also be applied to content includes a hybrid of traditional audio-video and fully immersive VR/AR/MR experiences, such as interactive video.

As shown in FIG. 1, image datasets 122 may be obtained from content database 120 via communication network 108 and network communication links 118. Image datasets 122 may be obtained in action 351 by software code 110, executed by hardware processor 104 of computing platform 102.

Continuing to refer to FIGS. 1 and 3, and with further reference to FIG. 2, flowchart 350 further includes generating, for each of image datasets 122, a respective statistical representation of each of one or more variables, such as independent variables 242, for use in detecting an image parameter, to provide a plurality of statistical representations (action 352). That is to say, in use cases in which a single independent variable is relied upon for detection of the image parameter, the plurality of statistical distributions provided by action 352 would include a single statistical distribution for each of image datasets 122. However, in use cases in which three independent variables are relied upon for detection of the image parameter, the plurality of statistical distributions provided by action 352 would include three statistical distributions for each of image datasets 122. The image parameter may be one of EOTF, quantization range, or color encoding primaries, to name a few examples.

EOTF: EOTF defines the input/output relationship between the nonlinear (electrical) video signal that is input to a display and the linear (optical) light value that is output by a display. Cathode ray tube (CRT) display technology was used to display video signals to viewers since the introduction of video itself in the middle of the 20th century until about the last decade, during which CRT technology was largely phased out. The ITU Radiocommunication Sector (ITU-R) standard Recommendation BT.1886 EOTF based on a gamma (power function exponent) value of 2.4 approximates the CRT EOTF and continues to be used for the display of SDR video signals using modern display technology such as is LCD and OLED. This ensures that the video content that was originally prepared for viewing on a CRT will look correct on a modern display operating in a similar viewing environment, although the actual display technology is different.

A typical reference viewing environment for SDR video signals conforms to ITU-R standard Recommendation BT.2035, which describes the configuration of the room where video mastering takes place and the configuration of the reference display such that reference white luminance of the display is 100 nits and reference black luminance is displayed at 0.01 nits or lower. In this ideal reference environment, the SDR reference display can show a sequential contrast ratio of 100 nits/0.01 nit=10,000 to 1. Display technology has advanced such that displays can show enhanced shadow details, brighter specular highlight details, brighter colors, and more saturated darks, beyond what was originally achievable with the SDR video format. A naive approach to supporting a new video HDR format for modern high-performance displays would be to simply use the BT.1886 EOTF with a larger luminance range, but this approach would likely lead to significant visual artifacts, such as contouring and banding, across a large portion of the increased luminance range. For this reason, a new EOTF that minimizes artifacts across a large luminance range from 10000 to 0.0001 nits was introduced called Perceptual Quantization (PQ) that was originally standardized by the SMPTE in 2014 as ST2084. The ST2084 EOTF was later added to the ITU-R BT.2100 standard for HDR television in 2016. Thus, a video signal is formatted for a specific EOTF, and if the wrong EOTF is used to process and display the image, the image will not look right.

Quantization Range: Historically, analog video signals represented black with a non-zero voltage. When the industry transitioned from analog to digital video, the non-zero signal value for black was retained for compatibility reasons. The standards for an 8-bit digital video format placed black at codevalue 16 and white at codevalue 235, many 8-bit digital video interface standards have used codevalue 0 and codevalue 255 for synchronization signals. Similarly, in standardized 10-bit digital video, reference black is at codevalue 64 and reference white at codevalue 940. The quantization and inverse quantization equations to convert to/from digital/analog video thus included the representation of black and white in the equations. These so called "narrow range," or "legal range" quantization equations are part of various digital video standards, including ITU-R standards Recommendation BT.601, Recommendation BT.709, Recommendation BT.2020 and Recommendation BT.2100.

The use of "full range" video signals originated from computer graphics and has become increasingly common. The "full range" quantization equations are simpler because they place reference black and reference white at codevalues 0 and 255 for 8-bit digital video. Full range 10-bit digital video places reference black at codevalue 0 and reference white at codevalue 1023. As the transition from High Definition (HD)) 1920×1080 formats to Ultra High Definition (UHD/4K) 3840×2160 formats has occurred, the use of full range quantization range for video masters has increased and the use of narrow range quantization range for video masters is slowly being phased out. Thus, a video signal is formatted for a specific quantization range, and if the wrong inverse quantization range equations are used to process and display the image, the image will not look right.

Color Encoding Primaries: Color encoding primaries are the actual colors of the R. G, and B components that are used to represent the video signal. Every pixel in a video image is represented by three numbers that characterize the picture information at a pixel's location within the image frame. For display—referred video signals that are used for video distribution, those three numbers are the R, G, and B codevalues in the form of digital integers. Consumer video formats have traditionally used 8 bits per integer to store the three numbers per pixel to represent the R, G, and B values. Modern HDR consumer video formats such as HDR10 and Dolby Vision use 10 or 12 bits per integer instead of 8 bits. Video master formats usually use 10, 12, or 16 bits per integer. The number of bits used to represent each integer is often called the bitdepth of the signal. For full range 10 bit signals, the reference black is represented with 3 integers (R,G,B)=(0,0,0) and the reference white is represented with 3 integers (R,G,B)=(1023,1023,1023). A pixel that is 100% red would be represented by (R,G,B)=(1023, 0, 0). A pixel that has 50% the signal level hut is still pure red would be represented by (R,G,B)=(512, 0, 0). The ITU-R BT.709 standard used for HD) video masters specifies the red, green, and blue color encoding primaries using what are called "chromaticity coordinates" using the International Commission on Illumination (CIE) 1931 representation. The ITU-R BT.709 standard also specifies the color of white when the red, green, and blue values are equal. The BT.2100 standard uses the same color encoding primaries as BT.2020, which are much more saturated than the primaries of BT.709. The P3D65 color encoding primaries are defined in the standard SMPTE ST2113 and has color primaries that are more saturated than BT.709 but less saturated than BT.2100. The BT.709, P3D765 and BT.2020 standards use the same white point called D65 that approximates the daylight corresponding to a blackbody radiator with a temperature of 6500 Kelvin. If a video uses BT.709 encoding primaries, but is displayed using BT.2100 primaries, the video will look more saturated than intended. In contrast, if a video uses BT.2100 encoding primaries, but is display using 13T.709 primaries, the video will look more desaturated than intended. In UHD HDR workflows, sometimes content creators use P3D65 encoding primaries and sometimes they use BT.2100 encoding primaries. Thus, a video signal is formatted for specific color encoding primaries, and if the wrong color encoding primaries are used to process and display the image, the image will not look right.

Referring again to flowchart 350 in combination with FIGS. 1 and 2, the statistical representations generated in action 352 may take the form of a histogram of each independent variable, for example. Thus, in some implementations in which independent variables 242 in FIG. 2 are used to predict the image parameter, action 352 may provide a statistical representation such as a histogram of each of independent variables 242, for each of image datasets 122. Action 352 may be performed by software code 110, executed by hardware processor 104 of computing platform 102.

Continuing to refer to FIGS. 1 and 3 in combination, flowchart 350 further includes correlating each of the plurality of statistical representations generated in action 352 with one of the plurality of content types that ML model(s) 112 is/are being trained to distinguish between, to produce training data 124 (action 353). By way of example, in some implementations the plurality of content types that ML model(s) is/are being trained to distinguish between may include SDR content and HDR content. In those implementations, the statistical representations generated in action 352 may be labeled as one of SDR or HDR to produce training data 124. Training data 124 may be produced in action 353 by software code 110, executed by hardware processor 104 of computing platform 102.

Continuing to refer to FIGS. 1 and 3 in combination, flowchart 350 further includes training ML model(s) 112, using training data 124, to predict that the content type of another dataset matches at least one of the content types ML model(s) was/were trained to distinguish between (action 354). It is noted that, in various implementations, ML model(s) 112 may take the form of one or more random decision forests or one or more NNs, or any combination thereof. The training of ML model(s) 112 in action 354 may be performed by software code 110, executed by hardware processor 104 of computing platform 102.

Figure 4:
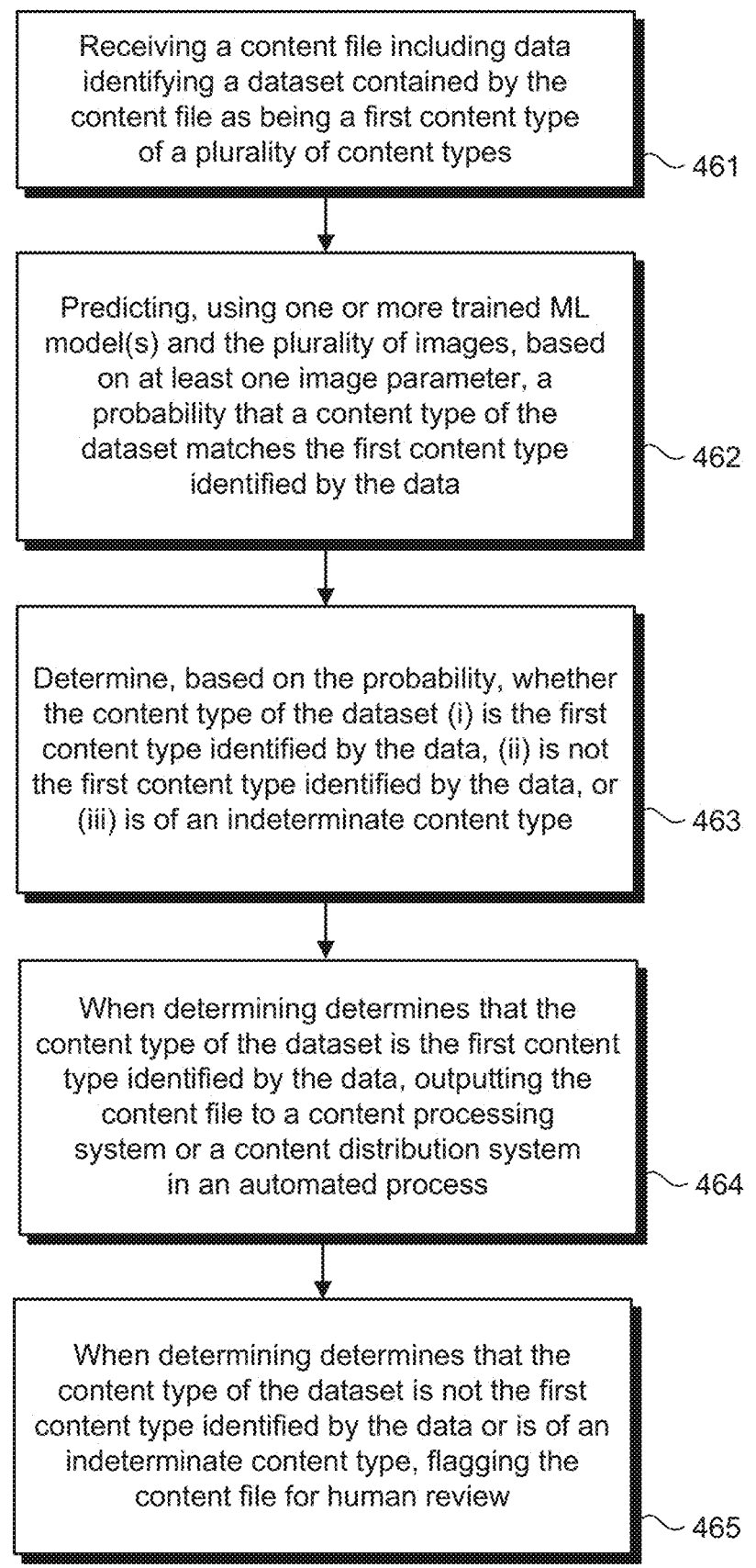
FIG. 4 shows a flowchart presenting an exemplary method for performing ML model-based detection of content type, according to one implementation.

The functionality of system 100 and software code 110 will be further described by reference to FIG. 4. FIG. 4 shows flowchart 460 presenting an exemplary method for performing ML model-based detection of content type, according to one implementation. With respect to the actions described in FIG. 4, it is noted that certain details and features have been left out of flowchart 460 in order not to obscure the discussion of the inventive features in the present application.

Referring to FIG. 4 in combination with FIG. 1, flowchart 460 begins with receiving content file 126 including data identifying dataset 128 contained by content file 126 as being a first content type of a plurality of content types (action 461). The content included in dataset 128 may include video unaccompanied by audio or audio-video content having both audio and video components. It is noted that because the present techniques for analyzing content type focus on video characteristics, the presence or absence of an audio component does not affect the analysis.

In some implementations, as noted above, the content included in dataset 128 may be or include digital representations of persons, fictional characters, locations, objects, and identifiers such as brands and logos, for example, which populate a VR, AR, or MR environment. Moreover, that content may depict virtual worlds that can be experienced by any number of users synchronously and persistently, while providing continuity of data such as personal identity, user history, entitlements, possessions, payments, and the like. In addition, and as further noted above, the solution for detecting content type disclosed by the present application may also be applied to content includes a hybrid of traditional audio-video and fully immersive VR/AR/MR experiences, such as interactive video.

As also noted above the expression "content type" refers to content having a particular combination of video format properties, and content types can be different if one or more of those video format properties differ. Examples of those video format properties include resolution, frame rate, chroma subsampling, EOTF, quantization range, color encoding primaries, and bitdepth. By way of example, in some implementations two different content types to be distinguished from one another by ML model(s) 112 may be SDR content and HDR content. Content file 126 may be received in action 461 by software code 110, executed by hardware processor 104 of computing platform 102.

Continuing to refer to FIGS. 1 and 4 in combination, flowchart 460 further includes predicting, using dataset 128 and ML model(s) 112 trained to distinguish between a plurality of content types, based on at least one image parameter, first probability 138 that the content type of dataset 128 matches or does not match the first content type identified by the data included in content file 126 (action 462). That is to say, first probability 138 is a content matching probability. The image parameter or parameters upon which the prediction in action 462 is based may include any of the video format properties identified above. That is to say, those one or more image parameters may include EOTF, quantization range, and color encoding primaries, for example.

It is noted that there are typically many frames in dataset 128, such as tens of thousands or hundreds of thousands of frames for example, and each frame may be classified as HDR or SDR, if some predetermined percentage of the frames, such as eighty percent (80%) or more are classified as HDR then dataset 128 can be determined to by HDR. ML model(s) may be or include a random forest model, meaning it uses a series of decision trees to make the best decision possible based on those parameters. The end result is to determine if the overall content is HDR or SDR for example.

In one implementation, ML model(s) 112 may be trained using the variables described above by reference to FIG. 2. As noted above, ML model(s) 112 may be implemented as one or more random decision forests, one or more NNs, or any combination thereof. Action 462 may be performed by software code 110, executed by hardware processor 104 of computing platform 102, and using ML model(s) 112.

Continuing to refer to FIGS. 1 and 4 in combination, flowchart 460 further includes determining, based on first probability 138, that the content type of dataset 128 (i) is the first content type identified by the data included in content file 126. (ii) is not the first content type identified by that data, or (iii) is of an indeterminate content type (action 463). In some implementations, the determination that the content type of dataset 128 is the first content type identified by the data included in content file 126 may be based on one or more predetermined probability thresholds.

For example, consider the use case in which the data included in data 126 identifies data set 128 as being HDR content. In that use case, when first probability 138 predicted by NIL model(s) 112 in action 462 equals or exceeds a high probability threshold, such as 80% or any other predetermined threshold, the content type of dataset 128 may be determined to be HDR content, i.e., is the content type identified by the data included in content file 126. Conversely, when first probability 138 predicted by ML model(s) 112 in action 462 is equal to or less than a low probability threshold, such as twenty percent (20%) or any other predetermined threshold, the content type of dataset 128 may be determined not to be HDR content, i.e., is not the content type identified by the data included in content file 126. In use cases in which first probability 138 is predicted to lie between those predetermined thresholds, e.g., greater than 20% and less than 80%, the content type of dataset 128 may be considered indeterminate.

In some implementations, ML model(s) 112 may include a plurality of ML models each trained to predict a content matching probability for a different content type. For example, and as noted above, in some implementations, ML model(s) 112 may be trained to distinguish between the content types SDR content and HDR content. In some of those implementations, one ML model of ML model(s) 112 may be trained to predict the probability that the content type of dataset 128 is SDR content, and another ML model of ML model(s) 112 may be trained to predict the probability that the content type of dataset 128 is HDR content. In those implementations, the determination that the content type of dataset is the content type identified by the data included in content file 126 may be made based on a plurality of probabilities output by ML model(s) 112.

For example, when the data included in content file 126 identifies dataset 128 as HDR content and the probability predicted by ML model(s) 112 that the content type of dataset 128 is HDR content equals or exceeds a high probability threshold, such as 80% or any other predetermined threshold, the content type of dataset 128 may be determined to be HDR content, i.e., is the content type identified by the data included in content file 126, unless the probability predicted by ML model(s) 112 that the content type of dataset is SDR content is high as well. As noted above, there are typically many frames in dataset 128 and each frame may be classified as H-DR or SDR. As long as some predetermined percentage of the frames, such as 80% or more, for example, are classified as HDR, then dataset 128 can be determined to be HDR, even if some frames are determined to be of indeterminate content type. Conversely, when the probability predicted by ML model(s) 112 that the content type of dataset 128 is HDR content is equal to or less than a low probability threshold, such as 20% or any other predetermined threshold, the content type of dataset 128 may be determined not to be HDR content, i.e., is not the content type identified by the data included in content file 126.

In use cases in which the probability predicted by ML model(s) 112 that the content type of dataset 128 is SDR content rather than HDR content equals or exceeds a high probability threshold, such as 80% or any other predetermined threshold, and the probability that the content type of dataset 128 is HDR content is equal to or less than a low probability threshold, such as 20% or any other predetermined threshold, the content type of dataset 128 may be determined to be SDR content. However, in use cases in which the probability predicted by ML model(s) 112 that the content type of dataset 128 is SDR content equals or exceeds a high probability threshold, such as 80% or any other predetermined threshold, and in which the probability predicted by ML model(s) 112 that the content type of dataset 128 is HDR content also equals or exceeds that high probability threshold, or where the probability that the content type of dataset 128 is HDR content and the probability that the content type of dataset 128 is SDR content both fall below a predetermined probability threshold, the content type of dataset 128 may be considered to be indeterminate.

Thus, in some implementations hardware processor 104 further executes software code 110 to predict, using ML model(s) 112 and dataset 128, and based on the at least one image parameter utilized in action 462, a second probability that the content type of dataset 128 matches a second content type of the plurality of content types that ML model(s) is/are trained to distinguish between. In those implementations, determining that the content type of dataset 128 (i) is the first content type identified by the data included in content file 126, (ii) is not the first content type identified by that data, or (iii) is of an indeterminate content type, in action 463, is further based on that second probability that the content type of dataset 128 matches the second content type of the plurality of content types. Whether the determination performed in action 463 is based on first probability 138 alone, or first probability 138 and one or more other probabilities predicted using ML model(s) 112, that determination may be performed by software code 110, executed by hardware processor 104 of computing platform 102.

In use cases in which the first probability predicted in action 462 and the second probability lead to different determinations, i.e., the first probability that the content type is HDR is high and the second probability that the content type is SDR is high, a classification error has occurred. Nevertheless, and as noted above, there are typically many frames in dataset 128 and each frame may be classified as HDR or SDR. As long as some predetermined percentage of the frames, such as 80% or more, for example, are classified as HDR, then dataset 128 can be determined to be HDR, even if some frames are determined to be of indeterminate content produce conflicting predictions.

It is noted that each of SDR content and HDR content include different varieties or subgroups. For instance, HDR may be classified HDR-P3 or HDR-Rec2020, to name two examples. Moreover, various subgroups of SDR and HDR may use different EOTFs. Examples of such varying SDR and HDR EOTFs include SDR (BT.1886), HDR (ST2084), Hybrid Log Gamma (HLG), LOG, Linear. SDR Deinema, and HDR Deinema. Thus, in some use cases the present approach to detecting content type may further extend to distinguishing among SDR and HDR subgroups.

In some implementations in which hardware processor 104 further executes software code 110 to predict the second probability that the content type of dataset 128 matches a second content type of the plurality of content types that ML model(s) is/are trained to distinguish between, that prediction may be performed subsequent to action 462. However, in other implementations in which the second probability that the content type of dataset 128 matches a second content type is predicted, that prediction may be performed in parallel with, i.e. contemporaneously with, action 462.

In some implementations, the method outlined by flowchart 460 may conclude with action 463 described above. However, continuing to refer to FIGS. 1 and 4 in combination, in some implementations in which it is determined that the content type of dataset 128 is the first content type identified by the data included in content file 126, flowchart 460 may further include outputting content file 126 to content processing system 114 or content distribution system 116 in an automated process (action 464). It is noted that action 464 is optional because in some use cases it may be advantageous or desirable to store content file 126 in one or both of system memory 106 or content database 120, or because the content type of dataset 128 is determined not to be the first content type identified by the data included in content file 126. In implementations in which the method outlined by flowchart 460 includes action 464, action 464 may be performed by software code 110, executed by hardware processor 104 of computing platform 102.

Alternatively, and continuing to refer to FIGS. 1 and 4 in combination, in some implementations in which it is determined that the content type of dataset 128 is not the first content type identified by the data included in content file 126, flowchart 460 may further include flagging content file 126 for human review (action 465). It is noted that action 465 is optional because the content type of dataset 128 may be determined to be the first content type identified by the data included in content file 126. In implementations in which the method outlined by flowchart 460 includes action 465, action 465 may follow directly from action 463 and may be performed by software code 110, executed by hardware processor 104 of computing platform 102, for example by transmitting alert 140 to user system 130 via communication network 108 and network communication links 118.

With respect to the methods outlined by flowcharts 350 and 460, it is noted that, in various implementations, actions 351, 352, 353, and 354, actions 461, 462, and 463 (hereinafter "actions 461-463"), or actions 461-463 and 464, or actions 461-463 and 465, may be performed in an automated process from which human participation may be omitted.

Figure 5:
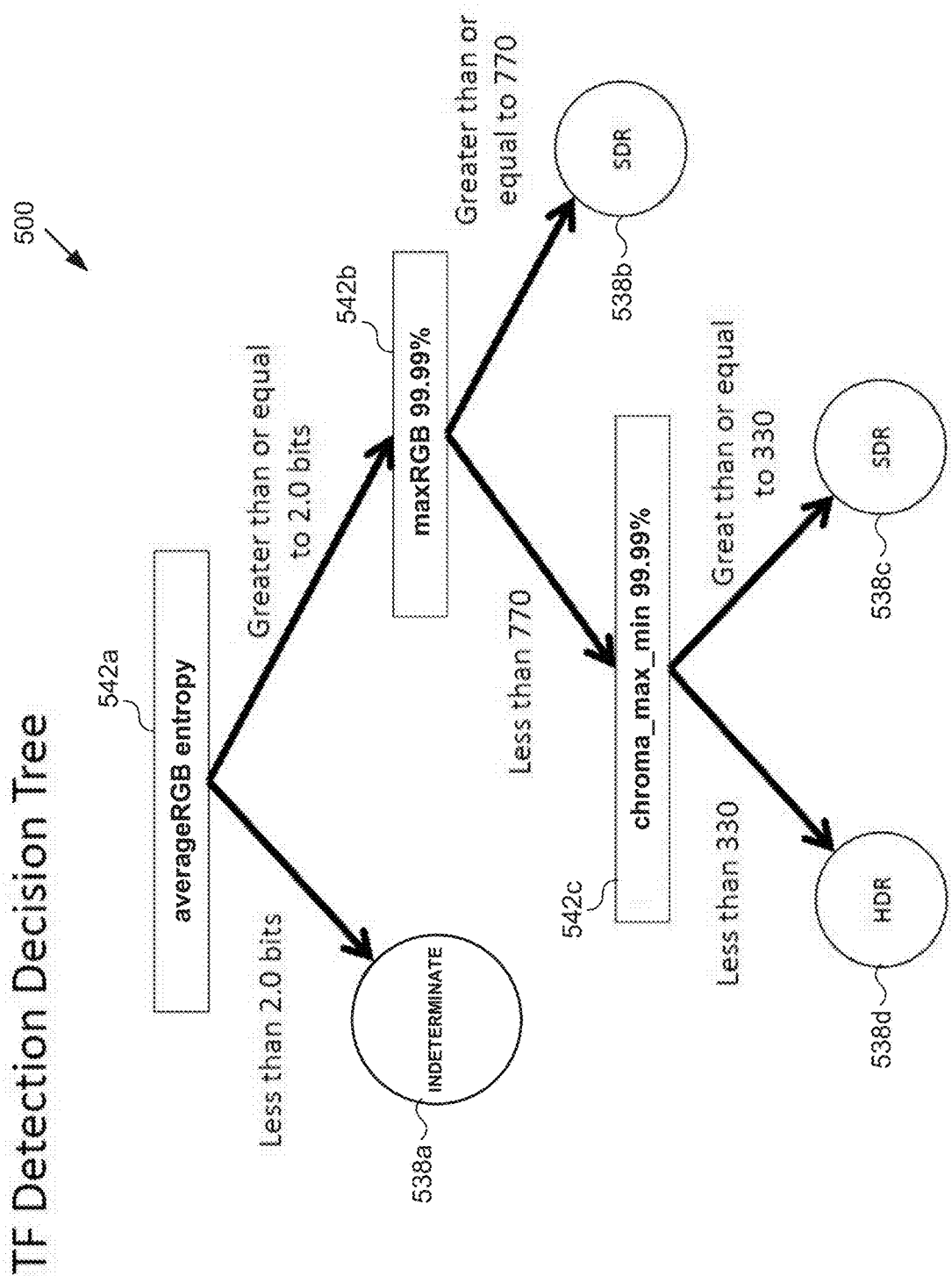
FIG. 5 shows a simple decision tree for detecting content type based on use of the electro—optical transfer function (EOTF) of content as an image parameter for distinguishing between content types, according to one implementation.

FIG. 5 shows simple decision tree 500 for detecting content type based on use of the EOTF of content as an image parameter for distinguishing between content types, and a subset of the variables described by reference to FIG. 2, according to one implementation. As shown in FIG. 5, decision tree 500 is based on the variables averageRGB entropy 542a, maxRGB at its $99.99^{th}$ percentile 542b, and chroma_max_min at its $99.99^{th}$ percentile 542c. It is noted that the averageRGB entropy, maxRGB, and chroma_max_min in FIG. 5 correspond respectively in general to averageRGB entropy, maxRGB, and chroma_max_min of independent variables 242, in FIG. 2, and may share any of the characteristics attributed to those corresponding features above. Also shown in FIG. 5 are alternative probabilities 538a, 538b, 538c, and 538d, each of which corresponds in general to first probability 138 in FIG. 3.

Referring to FIGS. 1 and 5 in combination, decision tree 500 depicts, in simplified form, the functionality of one exemplary implementation of ML model(s) 112 in which ML model(s) 112 is/are configured to output first probability 138 enabling a determination that the content type of dataset 128 is one of SDR content, HDR content, or indeterminate based on values of the variables averageRGB entropy 542a, maxRGB at its 99.99th percentile 542b, and chroma_max_min at its 99.99th percentile 542c. As shown in FIG. 5, when the variable averageRGB entropy 542a is less than 2.0 bits, decision tree 500 predicts probability 538a, which results in the determination that the content type of dataset 128 is indeterminate.

However, according to the example in FIG. 5, when averageRGB entropy 542a is greater than or equal to 2.0 bits, the value of maxRGB at its $990.99^{th}$ percentile 542b is evaluated. When maxRGB at its $99.99^{th}$ percentile 542b is greater than or equal to some value, e.g., 770, decision tree 500 predicts probability 538b, which results in the determination that the content type of dataset 128 is SDR content. When maxRGB at its $99.99^{th}$ percentile 542b is less than that same value, however, chroma_max_min at its 99.99th percentile 542c is evaluated. When chroma_max_min at its $99.99^{th}$ percentile 542c is greater than or equal to some value, e.g., 330, decision tree 500 predicts probability 538c, which results in the determination that the content type of dataset 128 is SDR content. Conversely, when chroma_max_min at its 99.99th percentile 542c is less than that same value, decision tree 500 predicts probability 538d, which results in the determination that the content type of dataset 128 is HDR content.

Thus, the present application discloses systems and methods for performing MIL model-based detection of content type. The novel and inventive systems and methods disclosed in the present application advance the state-of-the-art by introducing an AI inspired automated ML model-based approach to detecting, for example, whether the video format of a content file matches its expected format. As a result, the solution disclosed in the present application advantageously reduces the likelihood that a consumer will be exposed to defective content, while also reducing the time and costs required to correct flaws in content by enabling their early detection.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor;
a system memory storing a software code and at least one machine learning (ML) model trained to distinguish between a plurality of content types;
the hardware processor configured to execute the software code to:
receive a content file including data identifying a dataset contained by the content file as being a first content type of the plurality of content types;
predict, using the at least one ML model and the dataset, based on at least one image parameter, a first probability that a content type of the dataset matches the first content type identified by the data; and
determine, based on the first probability, that the content type of the dataset (i) is the first content type identified by the data, (ii) is not the first content type identified by the data, or (iii) is of an indeterminate content type.

2. The system of claim 1, wherein when determining determines that the content type of the dataset is the first content type identified by the data, the hardware processor is further configured to execute the software code to:
output the content file to a content processing system or a content distribution system in an automated process.

3. The system of claim 1, wherein when determining determines that the content type of the dataset is not the first content type identified by the data or is of the indeterminate content type, the hardware processor is further configured to execute the software code to:
flag the content file for human review.

4. The system of claim 1, wherein the hardware processor is further configured to execute the software code to:
predict, using the at least one ML model and the dataset, and based on the at least one image parameter, a second probability that the content type of the dataset matches a second content type of the plurality of content types;
wherein determining that the content type of the dataset (i) is the first content type identified by the data, (ii) is not the first content type identified by the data, or (iii) is of the indeterminate content type is further based on the second probability.

5. The system of claim 1, wherein the at least one image parameter comprises an electro-optical transfer function (EOTF) of the dataset.

6. The system of claim 1, wherein the at least one image parameter comprises one or more of an electro-optical transfer function (EOTF), a quantization range, or a color encoding primary of the dataset.

7. The system of claim 1, wherein the plurality of content types comprise standard dynamic range (SDR) content and high dynamic range (HDR) content.

8. The system of claim 1, wherein the at least one ML model comprises a random decision forest or a neural network.

9. A method for use by a system including a hardware processor and a system memory storing a software code and at least one machine learning (ML) model trained to distinguish between a plurality of content types, the method comprising:
  receiving, by the software code executed by the hardware processor, a content file including data identifying a dataset contained by the content file as being a first content type of the plurality of content types;
  predicting, by the software code executed by the hardware processor using at least one MIL model and the dataset, based on at least one image parameter, a first probability that a content type of the dataset matches the first content type identified by the received data; and
  determining, by the software code executed by the hardware processor based on the first probability, that the content type of the dataset (i) is the first content type identified by the data, (ii) is not the first content type identified by the data, or (iii) is of an indeterminate content type.

10. The method of claim 9, wherein when determining determines that the content type of the dataset is the first content type identified by the data, the method further comprises:
  outputting, by the software code executed by the hardware processor, the content file to a content processing system or a content distribution system in an automated process.

11. The method of claim 9, wherein when determining determines that the content type of the dataset is not the first content type identified by the data or is of the indeterminate content type, the method further comprises:
  flagging, by the software code executed by the hardware processor, the content file for human review.

12. The method of claim 9, further comprising:
  predicting, by the software code executed by the hardware processor using the at least one ML model and the dataset, and based on the at least one image parameter, a second probability that a content type of the dataset matches a second content type of the plurality of content types;
  wherein determining that the content type of the dataset (i) is the first content type identified by the data, (ii) is not the first content type identified by the data, or (iii) is of the indeterminate content type is further based on the second probability.

13. The method of claim 9, wherein the at least one image parameter comprises an electro-optical transfer function (EOTF) of the dataset.

14. The method of claim 9, wherein the at least one image parameter comprises one or more of an electro-optical transfer function (EOTF), a quantization range, or color encoding primaries of the dataset.

15. The method of claim 9, wherein the plurality of content types comprise standard dynamic range (SDR) content and high dynamic range (HDR) content.

16. The method of claim 9, wherein the at least one ML model comprises one of a random decision forest or a neural network.

17. A method for training a machine learning (ML) model to distinguish between a plurality of content types, the method comprising:
  obtaining a plurality of image datasets;
  generating, for each of the plurality of image datasets, a respective statistical representation of each of one or more variables for use in detecting an image parameter, to provide a plurality of statistical representations;
  correlating each of the plurality of statistical representations with one of the plurality of content types; and
  training the ML model, using the training data, to predict a first probability that a content type of another dataset matches at least one of the plurality of content types.

18. The method of claim 17, wherein the image parameter comprises an electro-optical transfer function (EOTF), a quantization range, or a color encoding primary of an image.

19. The method of claim 17, wherein the plurality of content types comprise standard dynamic range (SDR) content and high dynamic range (HDR) content.

20. The method of claim 17, wherein the ML model comprises one of a random decision forest or a neural network.

* * * * *